United States Patent [19]

Frost et al.

[11] Patent Number: 5,046,827
[45] Date of Patent: Sep. 10, 1991

[54] OPTICAL RECONSTRUCTION FILTER FOR COLOR MOSAIC DISPLAYS

[75] Inventors: Keith L. Frost, Scottsdale; Karen E. Jachimowicz, Goodyear; Michael J. Johnson, Phoenix, all of Ariz.

[73] Assignee: Honeywell Inc., Minneapolis, Minn.

[21] Appl. No.: 382,514

[22] Filed: Jul. 20, 1989

[51] Int. Cl.$^5$ .............................................. G02F 1/13
[52] U.S. Cl. ...................................... 359/54; 359/69; 359/66; 359/559
[58] Field of Search .......... 350/339 F, 339 D, 162.19, 350/333, 353, 162.12, 162.15; 340/716, 796

[56] References Cited

U.S. PATENT DOCUMENTS

| | | | |
|---|---|---|---|
| 3,957,354 | 5/1976 | Knop | 350/162.19 |
| 4,105,289 | 8/1978 | Hershel | 350/162.15 |
| 4,251,137 | 2/1981 | Knop et al. | 350/347 V |
| 4,255,019 | 3/1981 | Knop | 350/167 |
| 4,506,949 | 3/1985 | Knop | 350/162.19 |
| 4,800,375 | 1/1989 | Silverstein et al. | 350/339 F |
| 4,871,232 | 10/1989 | Grinberg et al. | 350/162.11 |

FOREIGN PATENT DOCUMENTS

| | | | |
|---|---|---|---|
| 0182645 | 5/1986 | European Pat. Off. | 350/334 |
| 0055624 | 3/1987 | Japan | 350/339 D |
| 2094022 | 9/1982 | United Kingdom | 350/162.12 |

OTHER PUBLICATIONS

Knop and Gale, "Diffractive Diffusers for Display Applications", 1986, SID Digest, pp. 354-356.

Primary Examiner—Rolf Hille
Assistant Examiner—Tan Ho
Attorney, Agent, or Firm—George A. Leone, Sr.

[57] ABSTRACT

An optical reconstruction filter in the form of a phase diffraction grating (that is, a diffractive diffuser) placed between a flat panel liquid crystal color matrix display and a viewer to optically filter flat panel images and present a higher quality image to the viewer.

26 Claims, 22 Drawing Sheets

X = PERIOD OF DIFFRACTION GRATING SURFACE $$SIN \alpha_p = \frac{p\lambda}{x}$$

X = PERIOD OF DIFFRACTION GRATING SURFACE

ORIGINAL PIXEL LUMINANCE PROFILE

DIFFRACTED PIXEL ORDERS:
RELATIVE POSITIONS AND INTENSITIES

DIFFRACTED PIXEL
LUMINANCE PROFILE

SPATIAL SAMPLING ARRAY FOR
DIAGONAL PATTERN
SINGLE PRIMARY COLOR

IDEAL LOW PASS TRANSFER FUNCTION
FOR DIAGONAL PATTERN

SINC

SQUARE

TRIANGLE
(TWO SQUARES CONVOLVED)

BELL
(THREE SQUARES CONVOLVED)

CUBIC B-SPLINE
(FOUR SQUARES CONVOLVED)

GAUSSIAN

SINC FUNCTION

PULSE FUNCTION
(ZERO ORDER INTERPOLATION)

RAMP FUNCTION
(FIRST ORDER INTERPOLATION)

1. DEPOSIT

2. EXPOSE

Fg. 17b

3. DEVELOP

OPTICAL RECONSTRUCTION FILTER FOR COLOR MOSAIC DISPLAYS

BACKGROUND AND SUMMARY OF THE INVENTION

1. Field of the Invention

This invention is directed to the area of optical reconstruction filters for color mosaic (matrix) displays in general and for flat panel liquid crystal displays in particular. The invention is directed to optically filter flat panel images, i.e., particularly to interpolating sampled image data shown on color mosaic displays using a phase diffraction grating in order to present a higher quality image to the viewer.

2. Background

The use of flat panel color matrix displays is increasing rapidly. These displays have regular structures of color pixels, as for example is shown in FIG. 1, which are used to create the color image. An existing problem is that the dotted and discontinuous appearance of images shown on color mosaic displays is not desirable and needs improvement. That is, the underlying grid structure results in objectionable visual artifacts commonly referred to as sampling noise. Examples of sampling noise are pixel edges and gaps. These artifacts cause flat panel color matrix displays to have noticeably lower image quality than CRTs, rendering them inadequate for many situations.

This problem of visible dot structure in color matrix displays can be viewed as a two-dimensional image processing situation, which can be understood more easily by comparing it to its one-dimensional analog as shown in FIG. 3. Segment 3a of FIG. 3 shows an ideal signal (image) which is to be processed. An initial filter, the anti-aliasing filter, 3b, is used at the outset to limit the bandwidth of the ideal signal to frequencies the processing system can handle. Frequencies that are too high result in spurious noise and moire patterns.

The cutoff frequency of the anti-aliasing filter is determined, by sampling theory, to be at one-half of the frequency the system uses to sample the incoming signal. The system in the two-dimensional case consists of an image generator and color matrix display device. This cutoff frequency is commonly referred to as the Nyquist frequency. The output of the anti-aliasing filter is the actual signal (image) to be entered into the system, as shown at section 3c. The signal (image) is then digitized through an A/D converter (image generator), shown at section 3d, and is ready to be transferred to the rest of the system.

At the other end of the system, the digital signal (image) passes through a D/A converter, shown at section 3e. The output waveform of the D/A, shown at section 3f, is a signal (image), with undesirable high frequency noise present. The noise is due to the underlying sampling grid and results from an incomplete reconstruction process. To complete the process, the signal is passed through another filter, the reconstruction filter, shown at section 3g, with its cutoff again determined by the Nyquist criterion. At this point, assuming ideal filtration has been accomplished, the output shape shown at section 3h, is identical to the system input at section 3c.

In the image processing case, just as for the one-dimensional signal, a reconstruction filter is needed to make the output identical to the system input. This invention is an optical reconstruction filter made by using a diffraction grating. The diffraction grating reconstruction filter is placed between the flat panel and the eye, as shown in FIGS. 4a and 4b. This filter interpolates between data points of like color and acts as a reconstruction filter for images to be displayed on the color matrix display. The cutoff frequencies of the filter are determined by the color matrix display sampling structure of the color matrix display. The result of applying this reconstruction filter is an output image identical to the system input, free of sampling grid artifacts.

This invention solves problems evident in the prior art. All color matrix displays, intentionally or not, have relied on one of two types of optical reconstruction filters; 1) the eye itself with its associated low pass filter characteristics, or 2) a diffuse, or scattering, optical surface.

The eye as a reconstruction filter does not work satisfactorily for current flat panel display resolutions. For example, present color matrix displays typically have pixels 6 to 8 mils across. Human factors experiments have determined these pixel sizes result in sampling grids all too easily seen by the eye. The frequency content of the color matrix display structure, the display sampling grid, is clearly well within the bandpass characteristics of human vision. The eye cannot filter out spatial frequencies this low at typical viewing distances. The resolution of color matrix displays must increase significantly before the eye alone will be a sufficient low pass filter. This, however, is the reconstruction filter most often used for color matrix display applications.

Some color matrix display applications have used a diffuse scattering surface to eliminate sampling grid artifacts. A diffuse surface scatters the light, giving it optical low pass filter characteristics. The more scattering the surface accomplishes, the more diffuse the filter, and the more it smooths the image. A common example is the diffuse picture glass frequently placed over photographs to reduce specular reflections. Some optical low pass filtering results as well. Sudden luminance changes are attenuated giving the image a softer, smoother look. But, while eliminating specular reflection and while softening the image, these filters exhibit strong diffuse reflections of ambient light. The more a filter diffuses, the more light is reflected over a wider range of viewing angles.

In display applications, even small amounts of reflected ambient light are objectionable. In higher ambients the diffuse reflections wash out the image altogether, rendering it unviewable. To get the amount of diffusion needed to eliminate the sampling noise of present color matrix display technology, the reflections become unacceptable, especially for cockpit display applications.

Another drawback of diffuse filters is that their passband characteristics are not tailorable over direction. The cutoff frequency is the same in all directions. For typical color matrix displays, whose underlying grid structure is not circularly symmetric, a filter with passband characteristics tailorable over direction is extremely desirable. Otherwise, the full frequency capability of the color matrix display is not taken to full advantage. Too much filtering will be exerted in some directions and/or too little will be exerted in others. Ideally, the low pass profile will exhibit characteristics determined directly by the color matrix display's own two-dimensional frequency capability.

SUMMARY OF THE INVENTION

The invention is a diffraction grating filter with defined spatial frequency passband characteristics, used to eliminate noise generated by color matrix dot structure.

The invention uses sampling theory to determine the frequency capability of the particular display. This is found by determining the Nyquist boundaries in two dimensions covering the surface of the display. The invention applies these two-dimensional boundaries to define the extent of traditional interpolation functions. Finally, the invention physically embodies these interpolation functions in the form of a phase diffraction grating in conjunction with the filter characteristics of the eye. The phase diffraction grating (may be a binary step type) is then applied over the surface of a color mosaic display to alter the point spread function of each pixel.

Subsequently, the luminance contained in each sample is distributed as a function of the distance from the sample point as defined by the interpolation function. Accordingly, information contained in each sample is added with information of surrounding samples of like primary hue to provide continuous luminance functions for each primary color. A higher fidelity representation of the desired output signal results. Continuity of the image function can be made through 1st, 2nd and higher order derivatives, depending on which interpolation function is selected to be embodied in the diffraction grating. Recognizing the lattice structure of each primary color is a key element of this invention. It can be applied to color mosaic patterns in general, including stripe, diagonal, delta, and quad pixel patterns.

That is, the invention provides continuity of the luminance functions of each primary hue on a color mosaic display in order to improve the image quality of sampled images. In the invention, a diffraction grating used as an optical reconstruction filter for color matrix displays, uses the phenomenon of diffraction to filter the image, instead of using scattering. The diffraction grating breaks each pixel image up into the various diffraction orders as it passes through the grating. These orders can be made to overlap and fall off in intensity, as shown in FIG. 5. The diffracted pixels overlap and cause interpolation among the pixels of like color, getting rid of the high spatial frequency grid noise. The exact interpolation function used is determined by the position and intensity of the diffracted orders, which is, in turn, determined by the geometry and period of the diffraction grating structure, and the refractive index of the material.

Using the diffraction grating as a reconstruction filter is very advantageous for display applications. By using diffraction instead of scattering, reflections from the filter are specular instead of diffuse. These reflections still need to be handled, but they are easier to manage than diffuse reflections. Specular reflections can be cut down to less than 0.5% with standard optical anti-reflection coatings. Destructive interference techniques can be used to cut the reflections down even further.

In addition, the diffraction grating can be tailored to give the desired passband characteristics and interpolation functions. The passband characteristics of the filter need not be constant over direction. The almost infinite range of order intensities and positioning gives the designer freedom to choose the best interpolation functions for the job. FIG. 12 shows some common interpolation functions, all of which would smooth the flat panel images. The surface profile of the diffraction grating can be designed to create these interpolation functions. This allows the reconstruction filter to be tailored to the exact structure of the color matrix display.

The invention is easily incorporated into the color matrix display structure. The filter is etched in glass and can be bonded to the front of the panel or even made in the flat panel substrate glass. An example of the structure of the flat panel color matrix display together with the diffraction grating reconstruction filter proximate in front of it is shown in FIG. 18.

BRIEF DESCRIPTION OF THE DRAWINGS

FIG. 12 waveforms g, h and i show resulting interpolations. Thus, waveforms g, h and i show examples of signal reconstruction using the ideal sinc function, and the triangle and pulse function.

FIG. 17a–17c show a process for making a diffraction grating with dichromated gelatin.

DETAILED DESCRIPTION

As described earlier, the invention is a diffraction grating, with defined spatial frequency passband characteristics, to be used as a reconstruction filter for color matrix displays, especially liquid crystal including active matrix liquid crystal flat panel color matrix displays such as is described in copending application Ser. No. 07/120,456 assigned to the same assignee. The invention interpolates among luminance values stored at each pixel site and, in concert with the low pass characteristics of the eye, renders a continuous image in the domain of each primary color. In other words, a diffraction grating filter is used to reduce flat panel image artifacts such as gaps, staircasing and color aliasing. This filter which is placed over a flat display panel of hundreds of pixels, smooths and precisely spreads the luminance profile of each pixel. The diffraction grating has several characteristics which make it useful for display applications including a first that the light spread function is variable over direction, and a second that the non-scattering reflection characteristics make reflections easier to control.

Figure 6A:
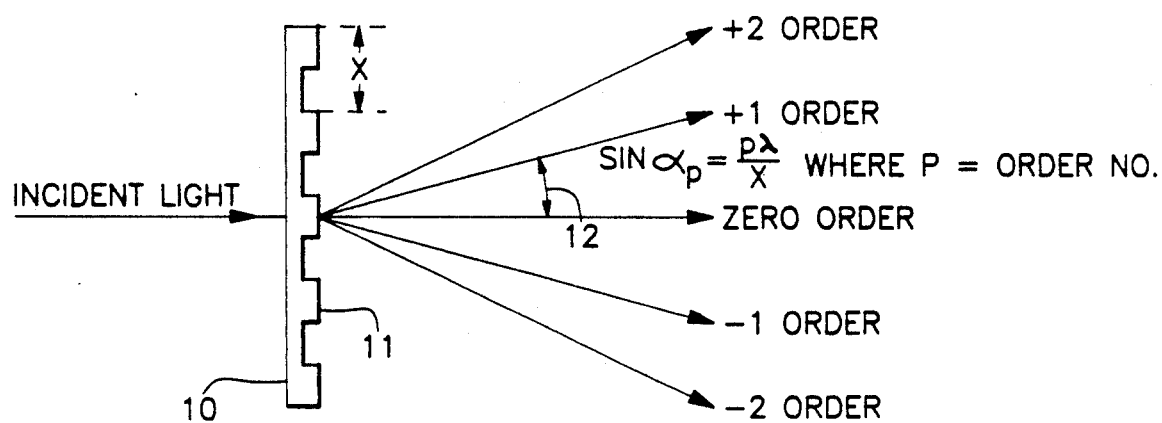
FIG. 6a illustrates how light breaks up into orders after passing through a diffraction grating where p=order no.

Referring now to FIG. 6a there is shown a diffraction grating 10, herein also referred to as a diffractive diffuser. The diffractive diffuser uses the phenomenon of diffraction, which is incident light breaking up into "orders" after passing through a periodic edge 11 of the diffraction grating. The zero, first and second orders are shown in the figure. The image passing straight through the filter is called the zero order. The images on either side of the zero order are the +1 and the −1 order. The next images on either side are the +2 and the −2 order. The angular relation 12 is shown in the form $$\sin \alpha_p = \frac{p\lambda}{x}$$

where $p$ = order number and $x$ = the grating interval.

Figure 6B:
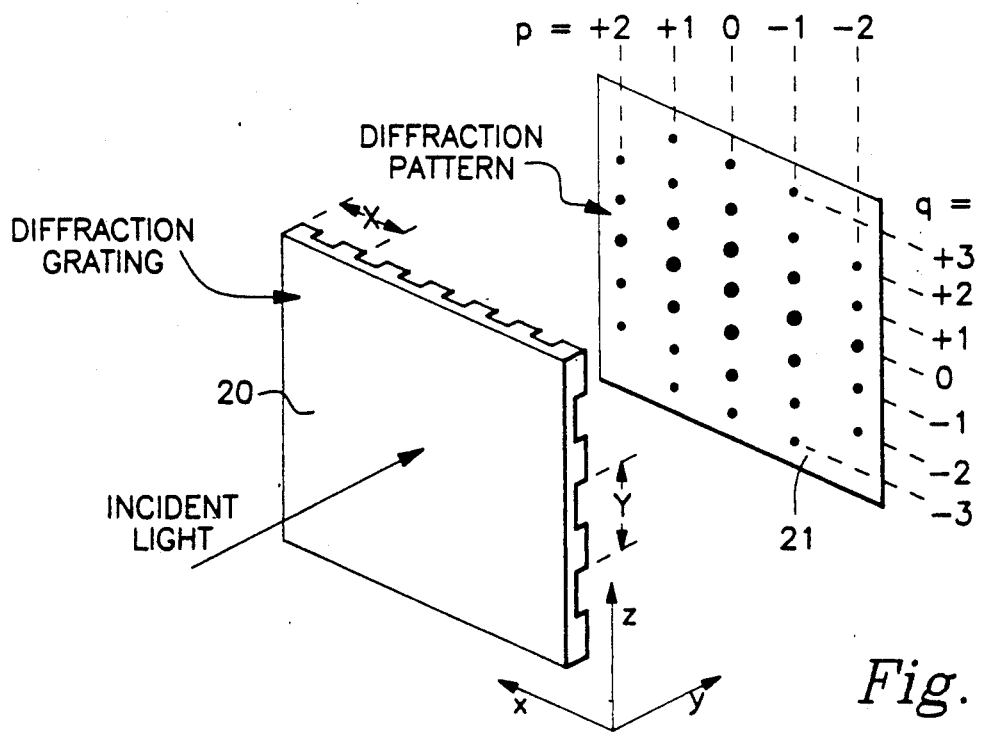
FIG. 6b illustrates a diffraction pattern of light through a two-dimensional diffraction grating where p, q=order no.

In FIG. 6b there is shown a two dimensional diffraction grating 20 having grating intervals x and y. For a two dimensional grating the diffraction pattern of light from the incident light beam is two dimensional as shown on plane 21. The letters p and q represent the order numbers in the two dimensions x and y. In actual case more than two or three orders may be used giving much smoother final image.

Figure 7:
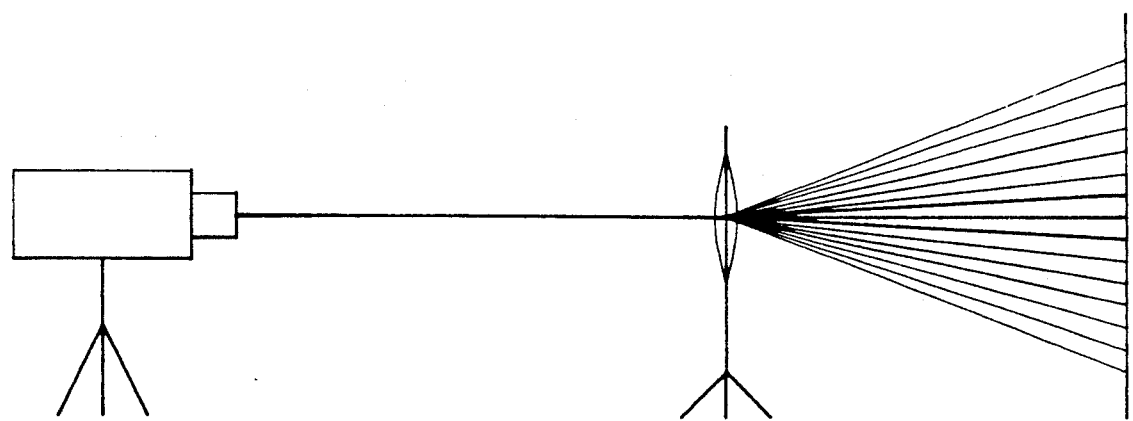
FIG. 7 is a photograph of a laser beam passing through a diffraction grating and breaking up into orders. $\chi=100$ lines/mm, y=100 lines/mm.

FIG. 7 is a photograph of a two dimensional diffraction pattern produced by a laser beam passing through a diffraction grating and breaking up into orders where $\chi = 100$ lines/mm and $y = 100$ lines/mm. The position and intensity of the various orders are determined by the geometry and period of the diffraction grating structure and the index variation of the material. In the case of the flat panel pixel image, the grating will be made such that the orders overlap and fall off in intensity, creating an image much more gaussian than the original "step" image of the pixel, as shown in FIGS. 5a–e. These diffracted pixels will overlap and cause interpolation between pixels. The charcteristics of a diffraction grating can be designed to be a function of direction, so the light spread function can be tailored to the flat panel pixel pattern.

Figure 5A:
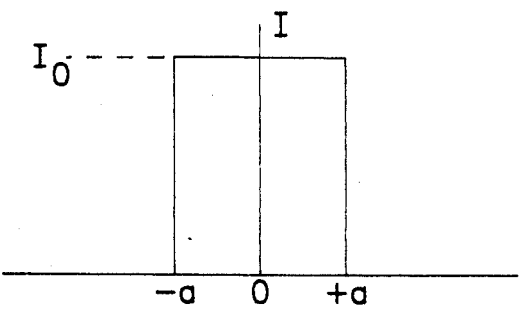
FIG. 5 shows how the original square pixel luminance is spread out and smoothed by diffraction. As more orders are used, the resulting diffracted pixel becomes smoother.
Figure 5B:
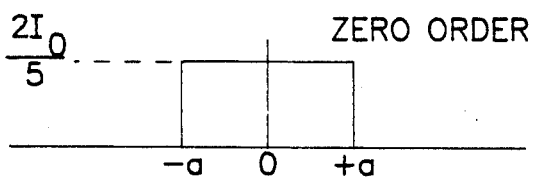
Figure 5C:
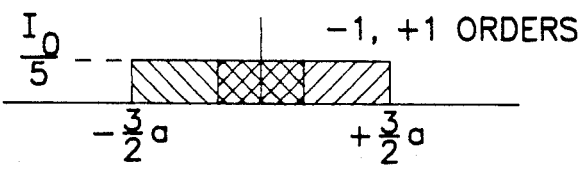
Figure 5D:
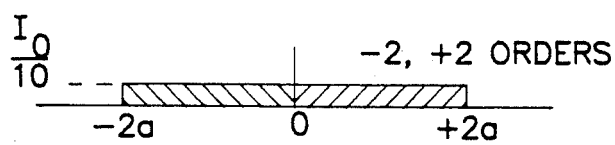
Figure 5E:
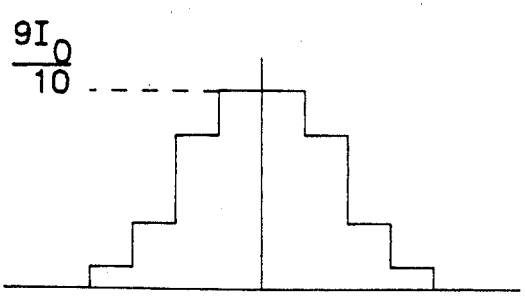

Referring now to FIG. 5 where I represents intensity, and particularly to FIG. 5a there is illustrated the original pixel image having an intensity represented by height $I_o$ and horizontal dimensions from −a to +a. The diffracted pixel orders change pixel luminance profile. FIGS. 5b, 5c and 5d illustrate the zero order, +1 and −1 orders and the +2 and −2 orders, respectively. FIG. 5b illustrates the zero order with an intensity of $2I_o/5$ and dimensions from −a to +a. FIG. 5c illustrates the +1 and −1 orders and shows an intensity of $I_o/5$ with horizontal dimension of 3a (that is from $-3/2a$ to $+3/2a$). FIG. 5d illustrates the +2 and −2 orders and shows an intensity of $I_o/10$ and dimensions of 4a. As relative intensity and position of diffracted order changes, the final pixel image changes. FIG. 5e illustrates the diffracted pixel image. In actual case, more than two orders may be used giving much smoother final image.

Figure 4B:
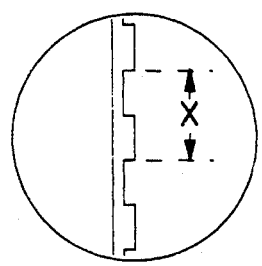
FIGS. 4a and 4b illustrate how the point image on a flat panel is spread out by the diffraction grating.
Figure 4A:
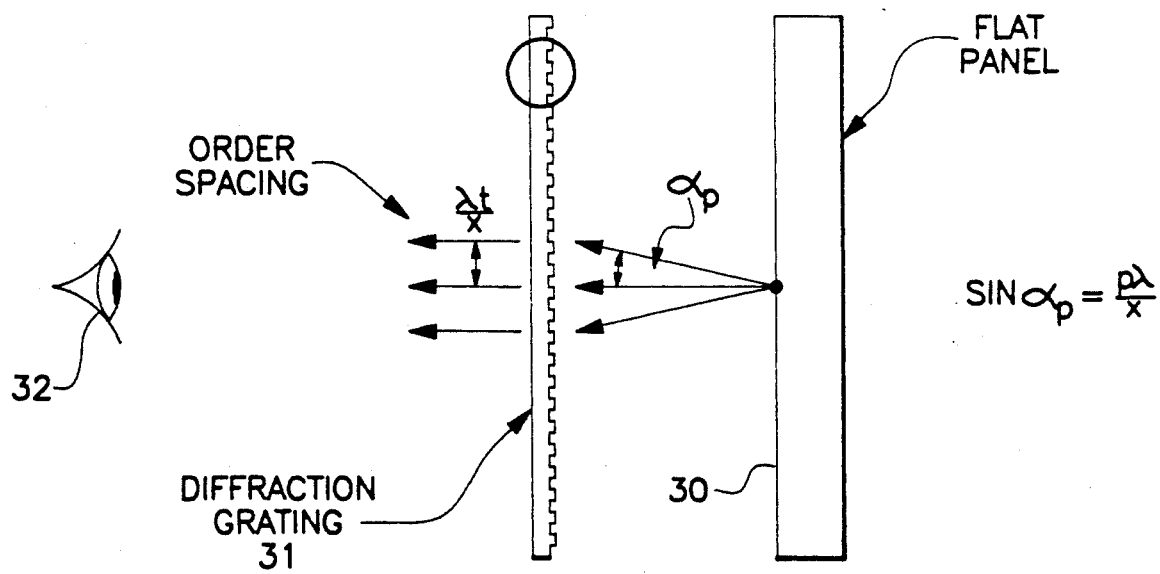

There are several different types of diffraction gratings. These include amplitude or phase types, and transmissive or reflective types. There are several manufacturing techniques, including holographic, ruled, and photolithographic. For the flat panel diffractive diffuser of this invention, a phase transmission grating is preferred because it has the highest transmission. It may be a binary step type. In a phase grating, the active diffractive material is transparent, with thickness variation across the surface. FIG. 4 is illustrative of how the image of a point on the flat image panel 30 gets spread out by a diffraction grating 31. The grating 31 will be positioned in front of the panel 30 as shown in FIG. 4, with the viewer 32 looking at the diffracted image.

A two axis grating will be used. The axes of the grating is preferably oriented to the major axes of the flat panel pixel pattern. The profile of the grating in $\chi$ and y is determined such that the luminance of same color pixels is interpolated in each direction. The distance between same color pixels is usually not the same in both axes. This distance is also different for different pixel layouts, such as the diagonal layouts versus the quad layouts. The grating profile is therefore tailored to a panel with a specific pixel size, spacing and layout. In one embodiment the grating is designed specifically for the Hosiden 6.7 mil diagonal mosaic panel.

It will be seen from FIG. 4 that a spacing or distance "t" is shown between flat panel 30 and diffraction grating 31. By controlling the spacing "t" the extent of interpolation desired can easily be obtained.

The diffraction grating 31 is effective to spread out the luminance profile of each pixel, interpolating between same color pixel images. In designing the diffraction grating surface profile, the final pixel luminance is a design factor. It has been determined that the actual shape of the interpolation function is not as critical as the amount of interpolation used to smooth out the flat panel image. For example, if the interpolation function spans several pixels, colors of individual pixels will blend together more effectively with neighboring pixels to alleviate a common complaint of liquid crystal flat panel displays that they show an objectionable amount of color bonding on misconvergence.

A current problem of the prior art is that pixel size and patterns result in a pointillist or dotted presentation of the image. Using any of a linear or gaussian or cubic B-spline shape for interpolation can eliminate or minimize the dotted appearance and produce a significant advance in the quality of the image. Care must be exercised so as to not introduce too much interpolation otherwise excessive blurring or defocussing will be perceived. Fortunately, the extent of the interpolation can easily be controlled by altering the spacing between the diffraction grating 31 and the display panel 30.

Figure 1:
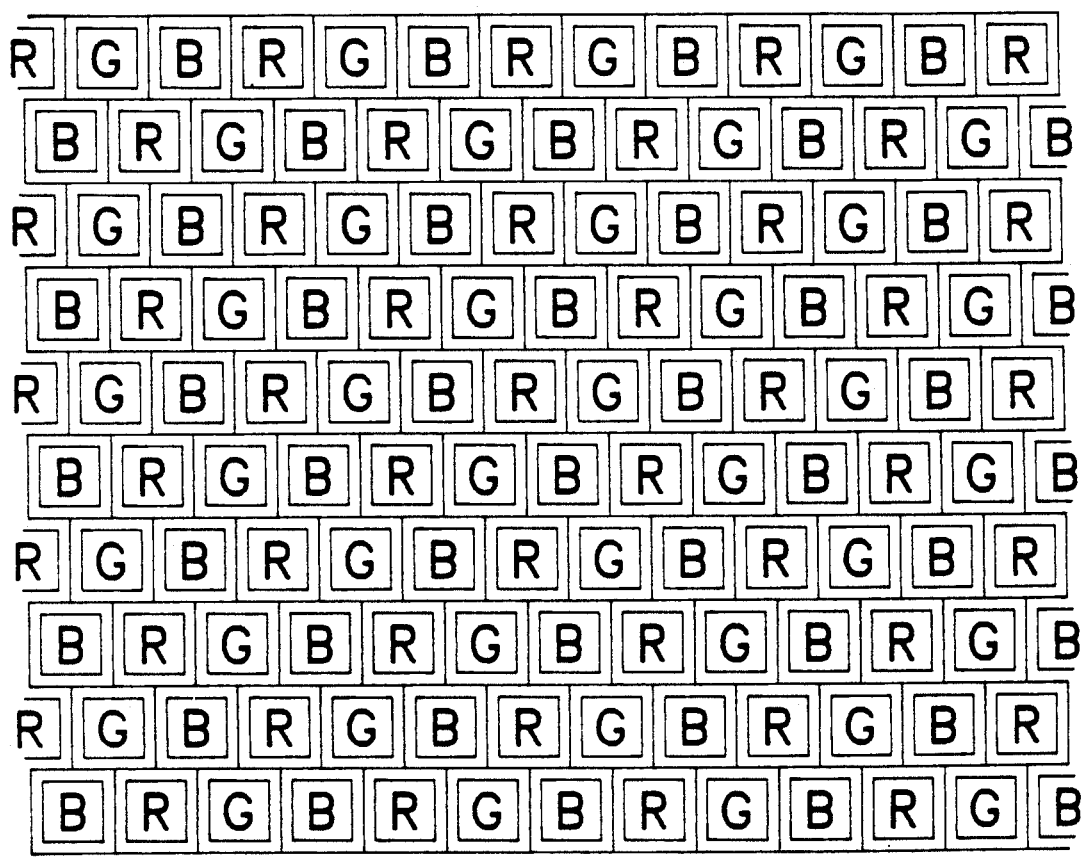
FIG. 1 shows a portion of a color matrix display including the individual pixels used to create an image on the display. The pixel pattern shown is the RGB delta matrix pattern.
Figure 2A:
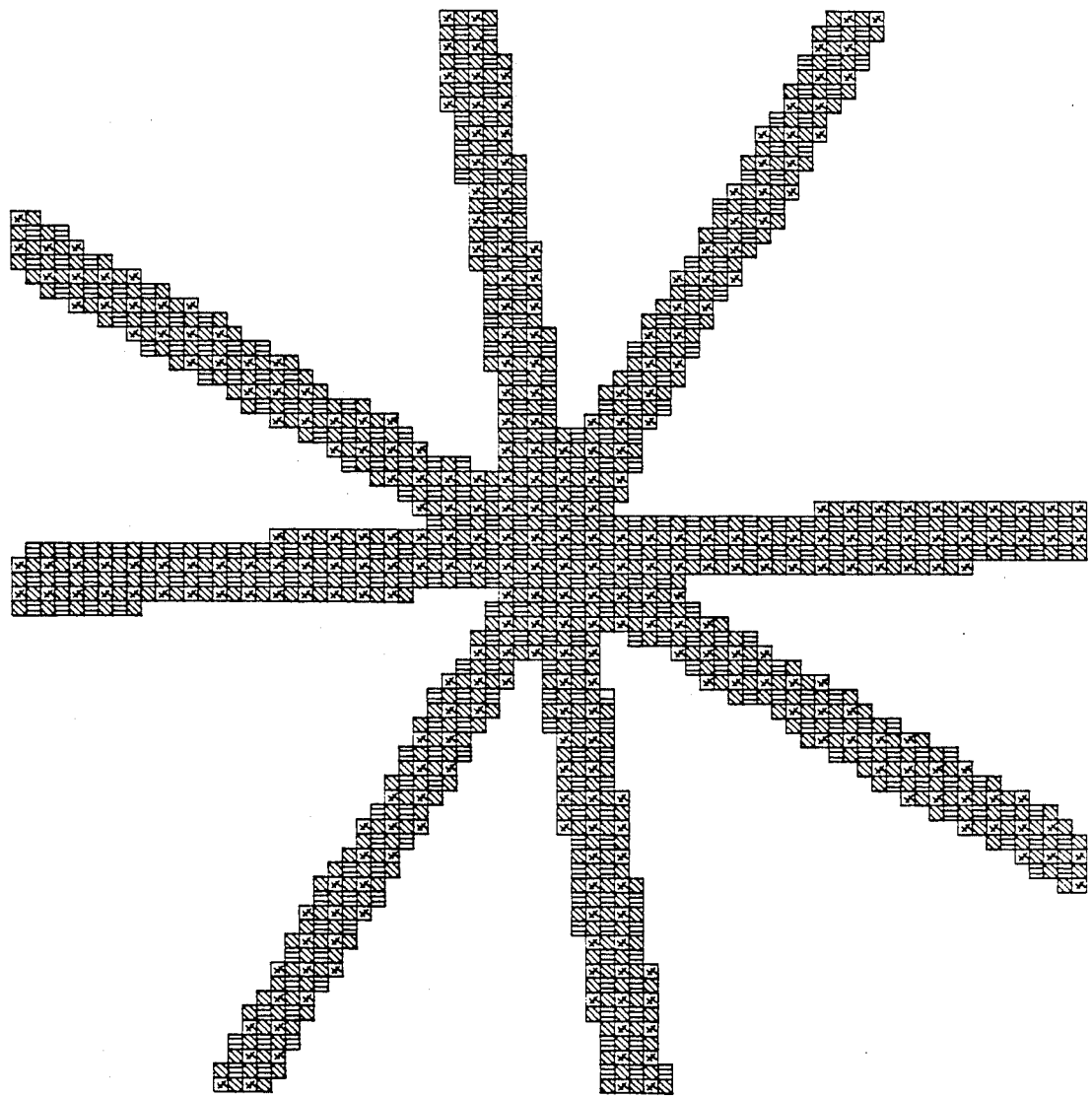
FIGS. 2a and 2b illustrate the problem of sampling noise on color matrix displays. The figure shows two images, one using the diagonal pixel pattern, the other using a quad-green pixel pattern. Each of these images is anti-aliased. Discrete pixels can still be distinguished, as well as the gaps between pixels. A reconstruction filter is needed to eliminate these grid structure artifacts.
Figure 2B:
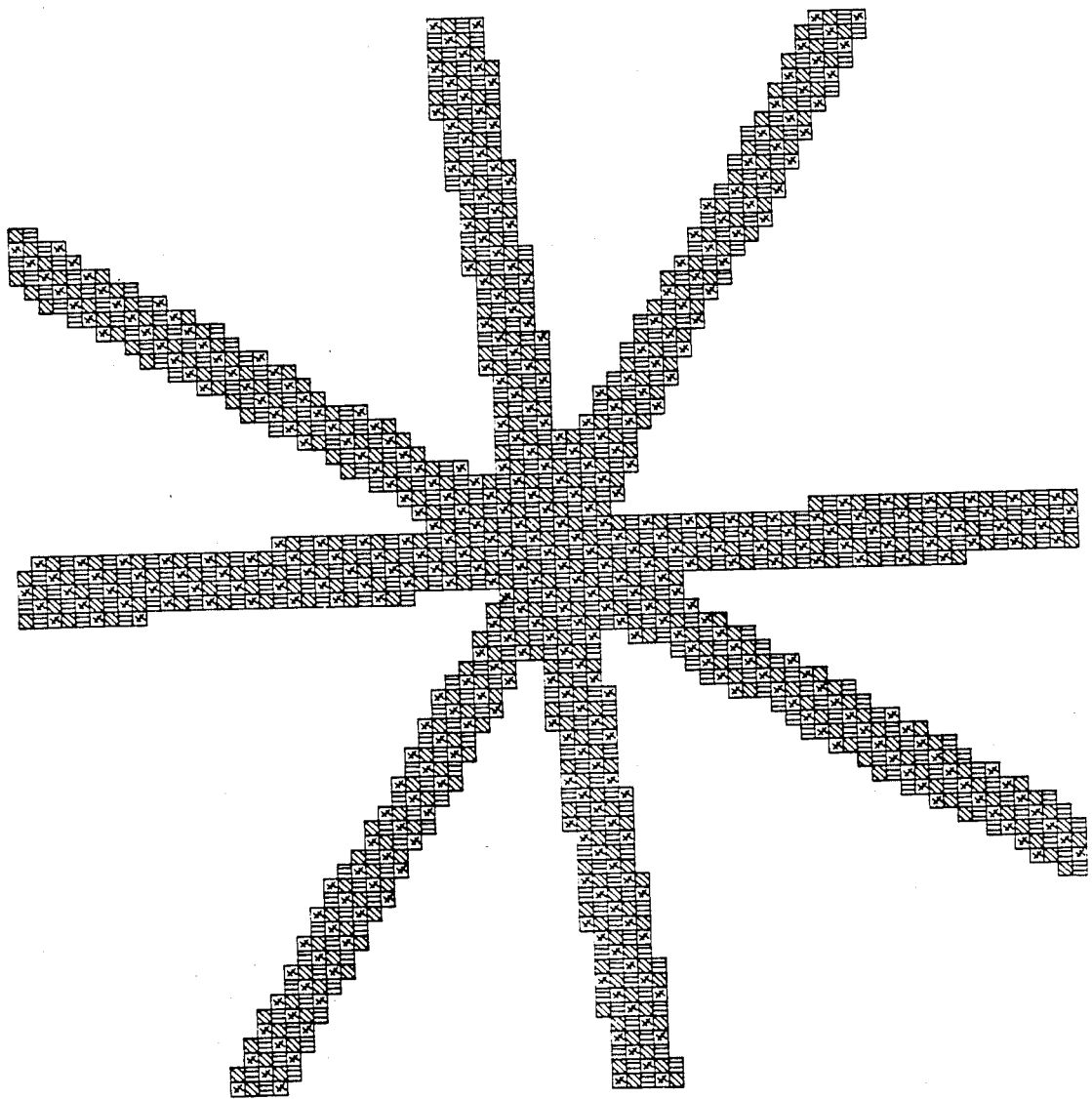
Figure 3:
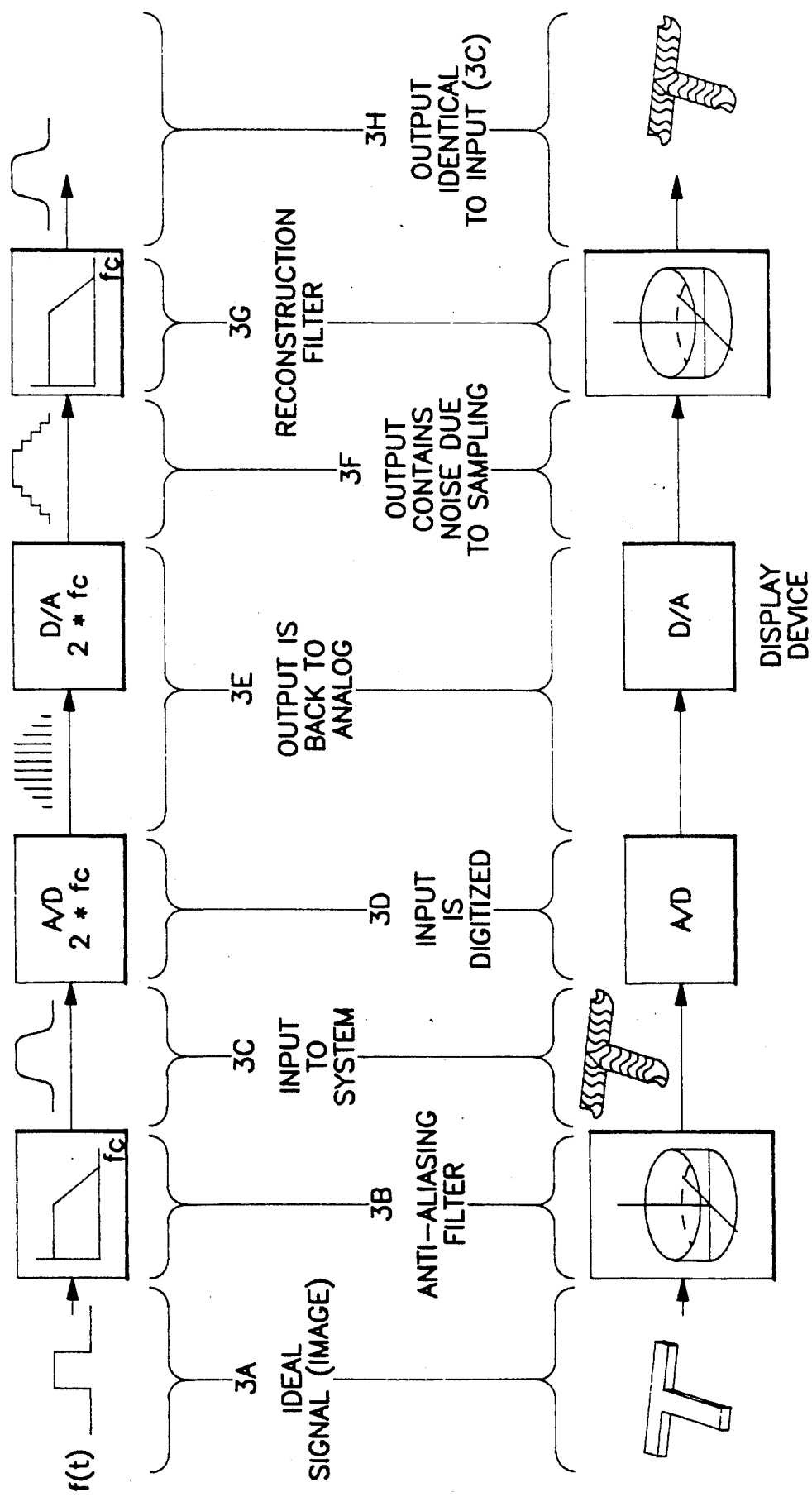
FIG. 3 shows the analogy between the signal processing model and the image processing model, showing how a low pass reconstruction filter is needed between the display and the eye.

FIG. 1 shows the individual red, green, and blue pixels of a typical color matrix display. FIG. 2 illustrates the pixel structure artifacts which can occur from this type of discrete image display system. Jagged transitions, on what are intended to be smooth lines detract from positional accuracy and, in the case of moving symbology, lines appear to move in a jumpy, discrete fashion. Ideally, the flat panel color matrix display would paint smoothly shaped symbols, which move in a smooth, analog manner and exhibit color purity. The diffraction grating, used as an optical reconstruction filter, is used to obtain this smooth image on a color matrix display. The manner in which the diffraction grating is used as a reconstruction filter for color matrix displays is explained in the following paragraphs.

Figure 8:
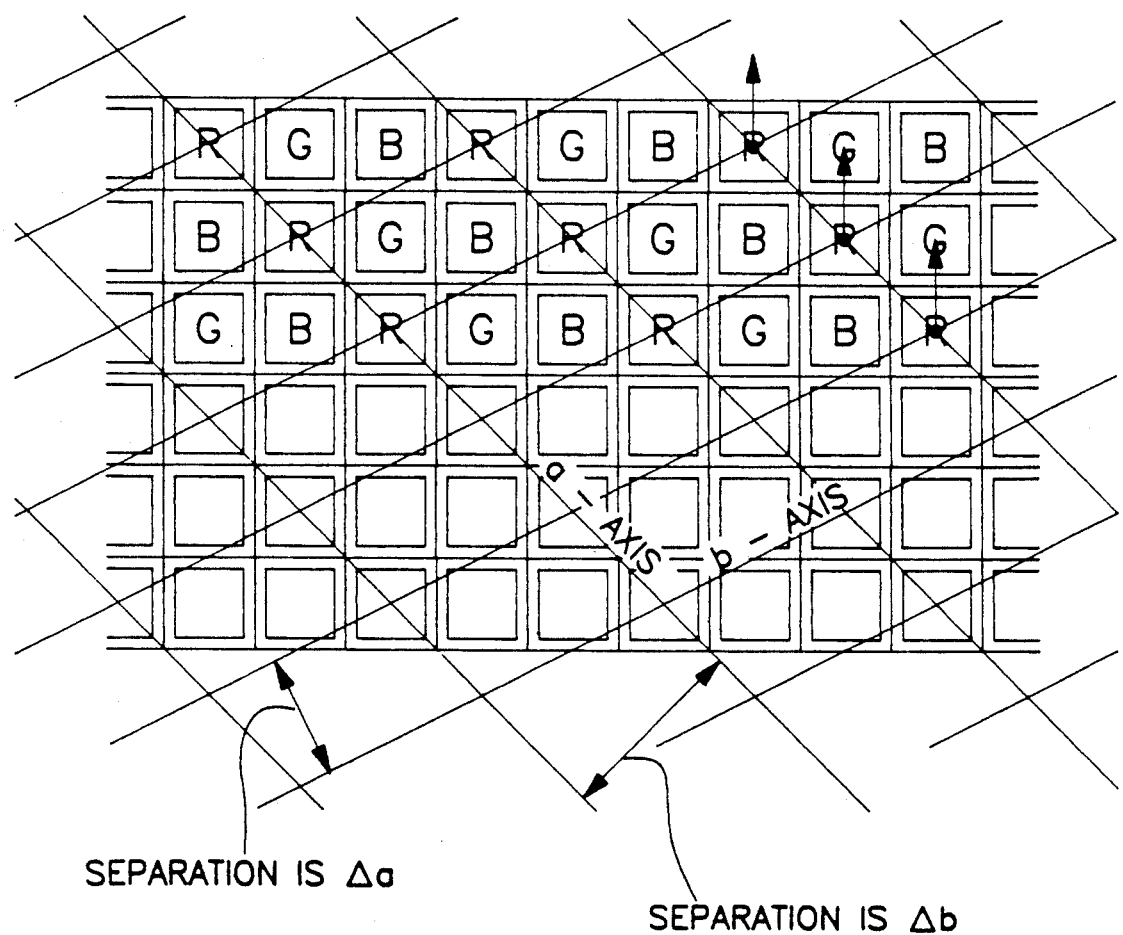
FIG. 8 shows a diagonal matrix pattern with the red primary lattice structure superimposed.
Figure 9:
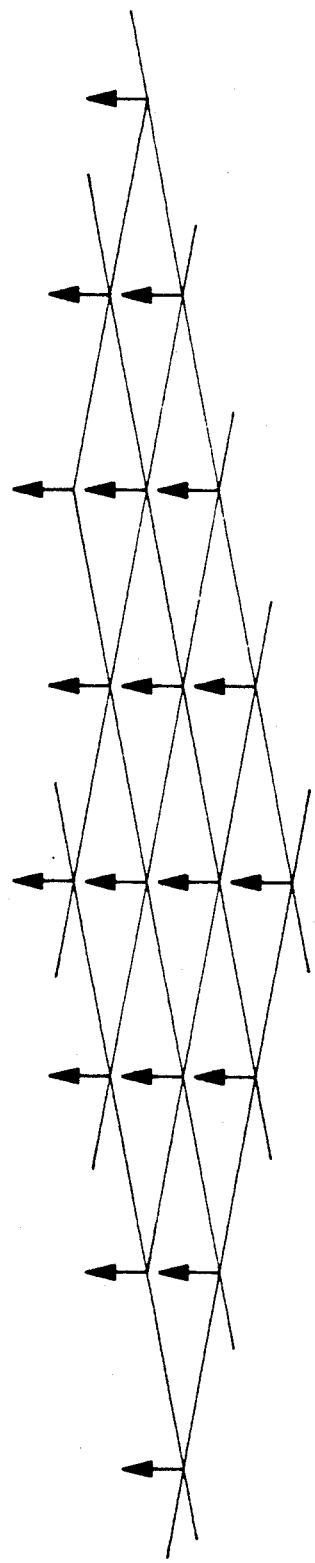
FIG. 9 shows the spatial sampling array for a single primary color on the diagonal matrix pixel pattern.

Determining the desired spatial frequency passband characteristics of the reconstruction filter is key, and begins with recognizing the underlying lattice structure of the color matrix display to be used. For example, FIG. 8 shows a diagonal matrix pattern with the red primary lattice structure superimposed. This lattice structure determines the spatial sampling array of the primary color, as shown in FIG. 9. For the diagonal matrix pixel pattern, the spatial sampling array for all three primary colors is the same.

Figure 10:
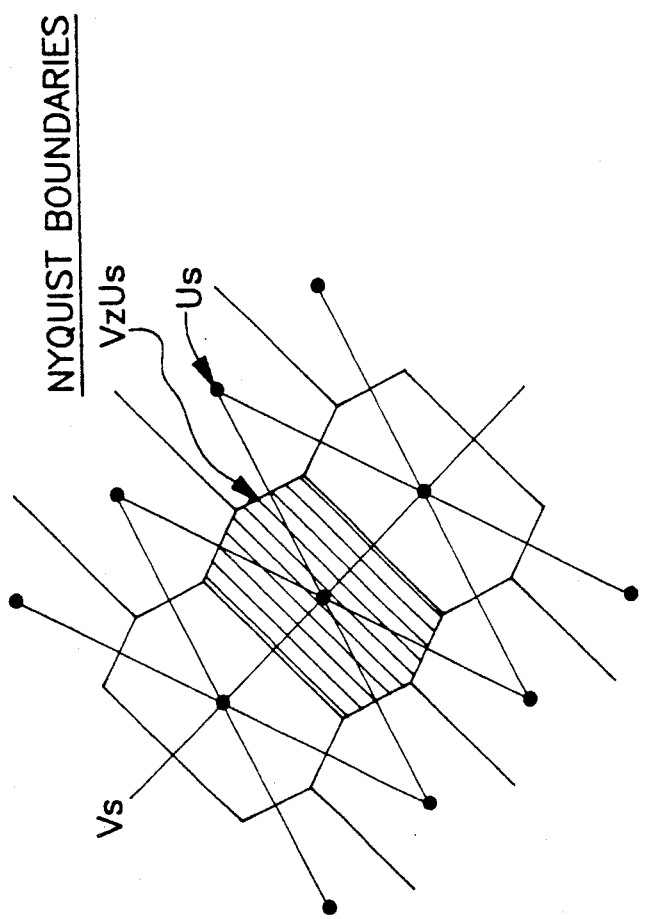
FIG. 10 illustrates the spatial frequency array for a single primary color on the diagonal matrix pixel pattern, and the corresponding Nyquist boundaries.
Figure 11B:
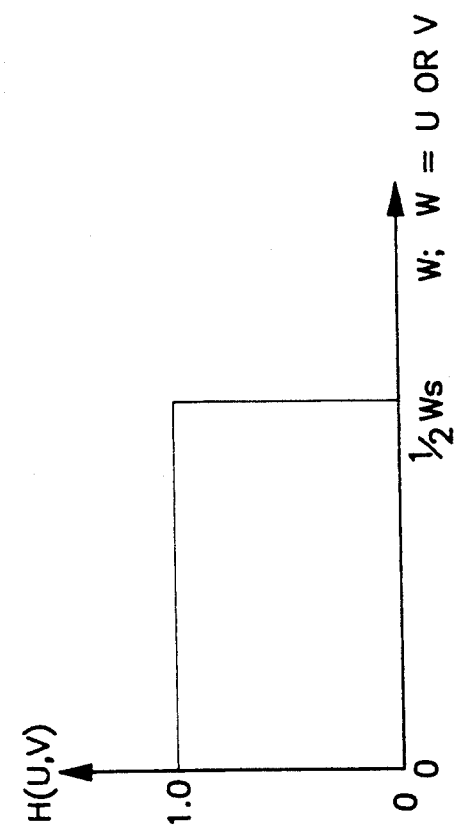
FIGS. 11a and 11b show the ideal low pass transfer function for the diagonal pixel pattern, corresponding to the Nyquist boundaries of FIG. 10.
Figure 11A:
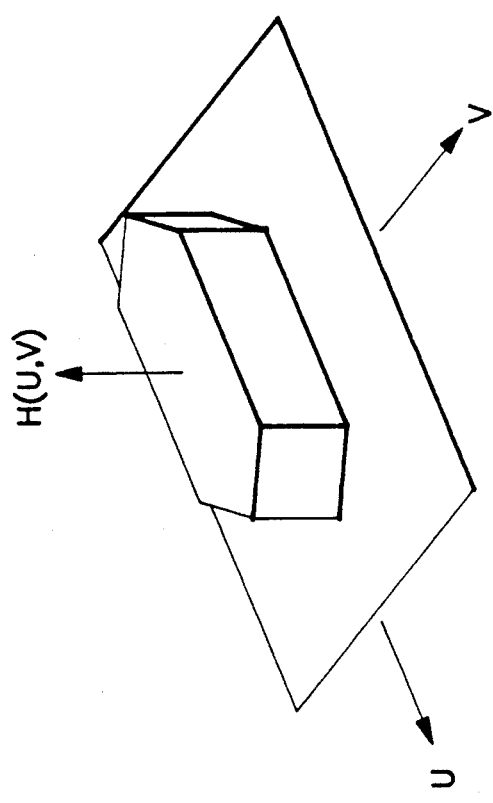

The spatial frequency lattice of the color matrix display is determined next. This is found by taking the Fourier transform of the spatial sampling array. Nyquist theory is used to determine the bandpass characteristics of the reconstruction filter. Nyquist sampling theory states that the maximum frequency which can be displayed on a color matrix display, without creating aliasing, is one half of the sampling frequency. The boundaries for maximum displayable frequencies therefore fall midway between the lattice points of the spatial frequency array. These boundaries, called the Nyquist boundaries, are shown in FIG. 10 for the diagonal matrix pattern. The Nyquist boundaries define the maximum frequency capability of the color mosaic in all directions. Therefore, the transfer function of the ideal bandpass filter for the diagonal pattern is as shown in FIGS. 11a and 11b.

Figure 12A:
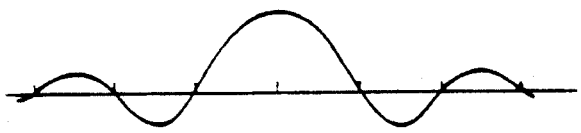
FIGS. 12a–12i show some common interpolation waveforms. The sinc waveform is the ideal, giving perfect reconstruction, but it is difficult to obtain.
Figure 12B:
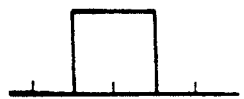
Figure 12C:
Figure 12D:
Figure 12E:
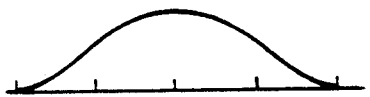
Figure 12F:
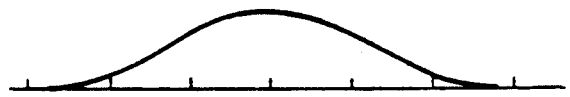
Figure 12G:
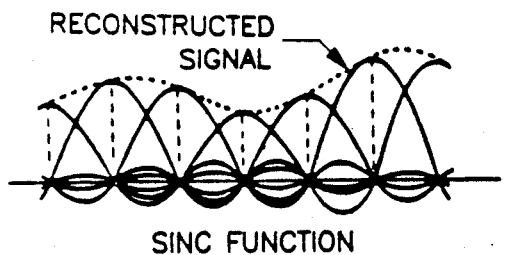
Figure 12H:
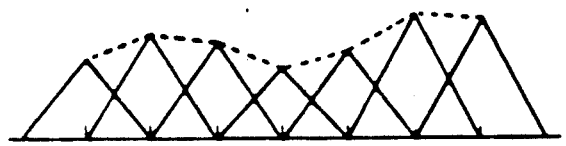
Figure 12I:
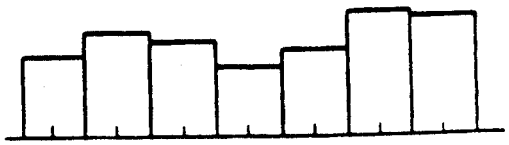
Figure 13A:
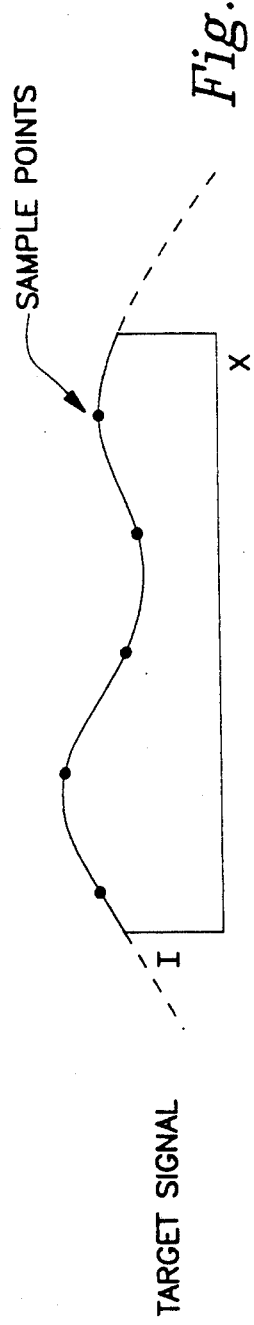
FIGS. 13a–13c gives some examples of a one dimensional reconstruction of a single primary signal using the triangle interpolation function. The higher order interpolation functions give better reconstruction.
Figure 13B:
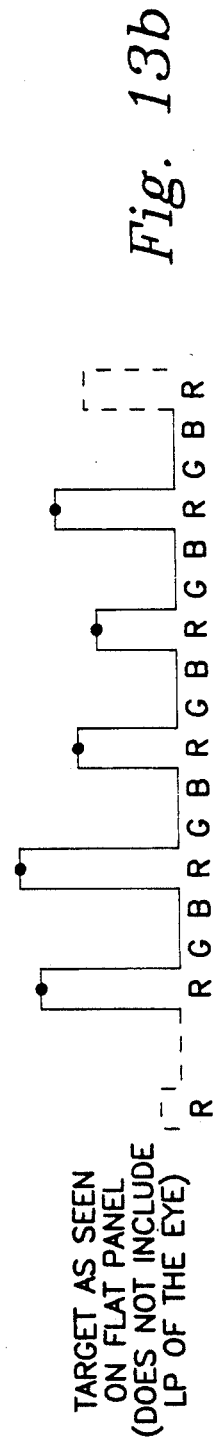
Figure 13C:
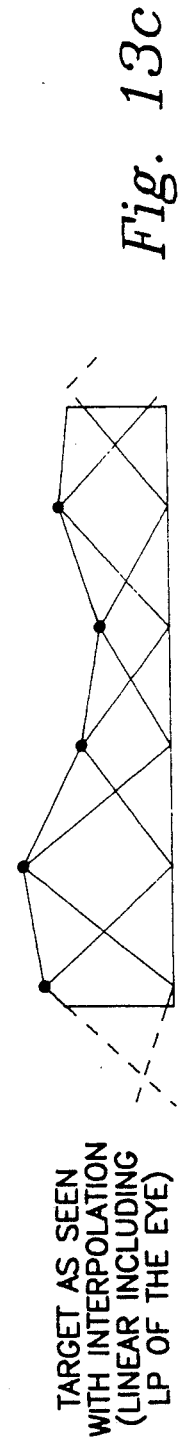
Figure 13D:
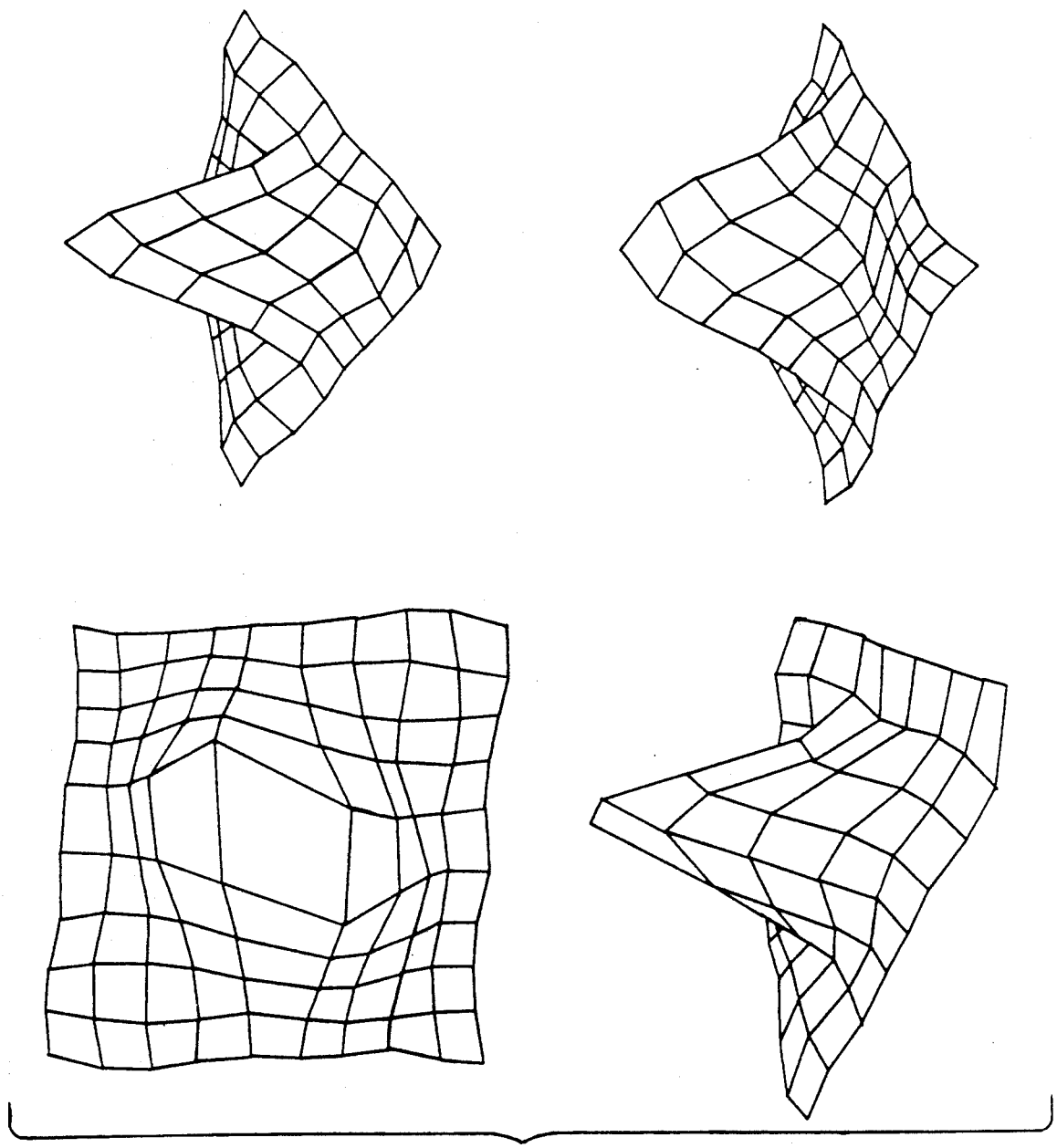
FIG. 13d shows the ideal two-dimensional interpolation function, the sinc function. Since this function is difficult to obtain, the lower order interpolation functions such as cubic B-spline or gaussian are usually used.

The next step is to determine the interpolation function to be used, with the extent of interpolation defined by the Nyquist boundaries. FIGS. 12a–12i shows some possible interpolation functions which give acceptable results. The triangle function, FIG. 12c, is one of the simplest, whereas some of the other functions, such as the cubic B-spline, FIG. 12e, give more accurate results. FIGS. 13a–13c give an example of a one-dimensional reconstruction using the triangle function. The higher order interpolations give better reconstruction of the signal. Ideally the sinc function (of the form sin (x)/x) would be used, as shown in FIG. 13d.

Thus, a number of interpolation waveforms are possible as is shown in waveform FIGS. 12a, 12b, 12c, 12d, 12e and 12f. Resulting interpolations are shown in waveform FIGS. 12g, 12h and 12i. Given that the expanse of the diffracted pattern can be changed at will by the distance of the grating from the panel, it is decided what shape would offer the best overall performance. Based on theory and practice, a three dimensional cubic B-spline (or a close approximation to it) has been selected as the target shape, see FIG. 12e. Over the proper interpolation distance, it connects each sample to its neighbors smoothly by ensuring continuity through the first and second derivatives. In this two-dimensional case the ratio of the long versus the short axis is determined by the diagonal pixel pattern itself.

Once the desired interpolation function has been chosen, the diffraction grating optical reconstruction filter is then designed to create the corresponding point spread function (PSF). The PSF of the diffraction grating is determined by the position and intensity of the various diffracted orders. The position and intensity of the diffracted orders is determined by the surface profile of the diffraction grating. The equations which relate the position and intensity of diffracted orders to the surface profile of a diffraction grating are standard diffraction equations. Of primary significance to the invention is that the surface profile of the grating controls the resulting PSF of the grating. By manipulating the surface profile, the PSF is varied and can be tailored to deliver the desired interpolation function. There are several ways of accomplishing this, including empirical, simulated annealing, or holographic techniques.

Figure 14:
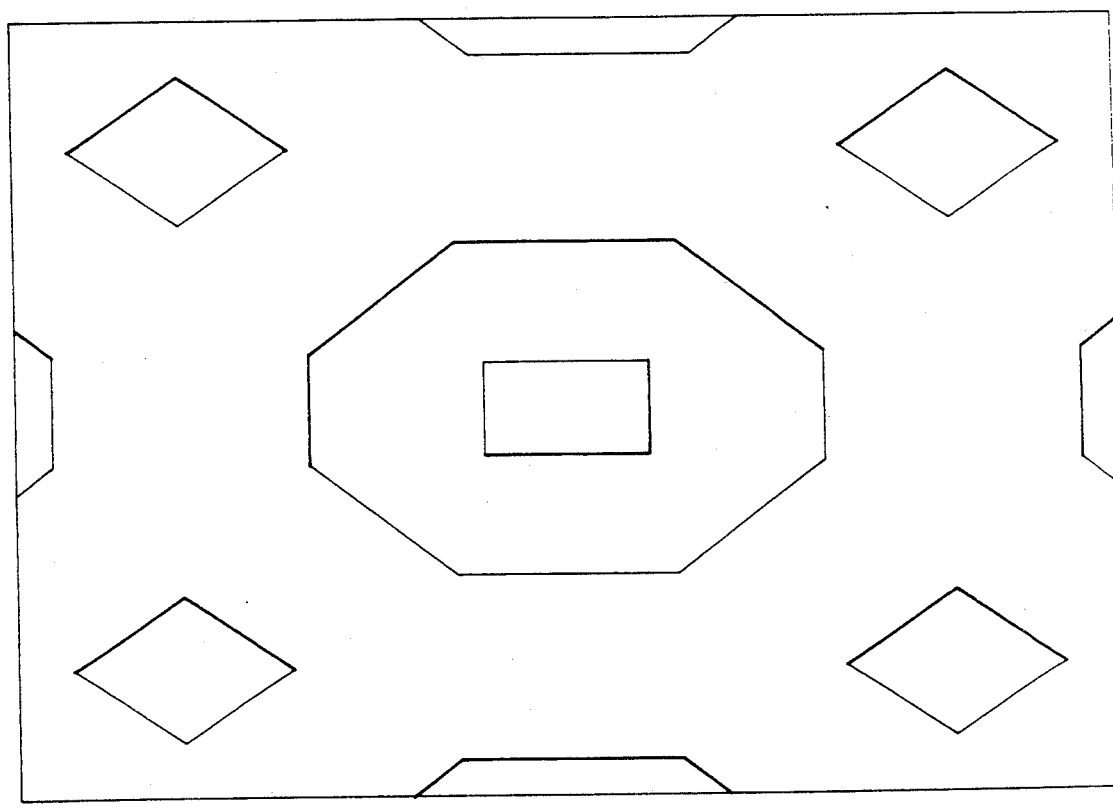
FIG. 14 shows a close-up of the surface profile for one embodiment of the invention, a phase diffraction grating designed for the RGBY quad pixel arrangement.

FIG. 14 shows one embodiment of the invention, a phase diffraction grating designed for the RGBY quad pixel arrangement. The interpolation function which was chosen for this application approximates the cubic B-spline, as shown in FIG. 15.

Figure 15:
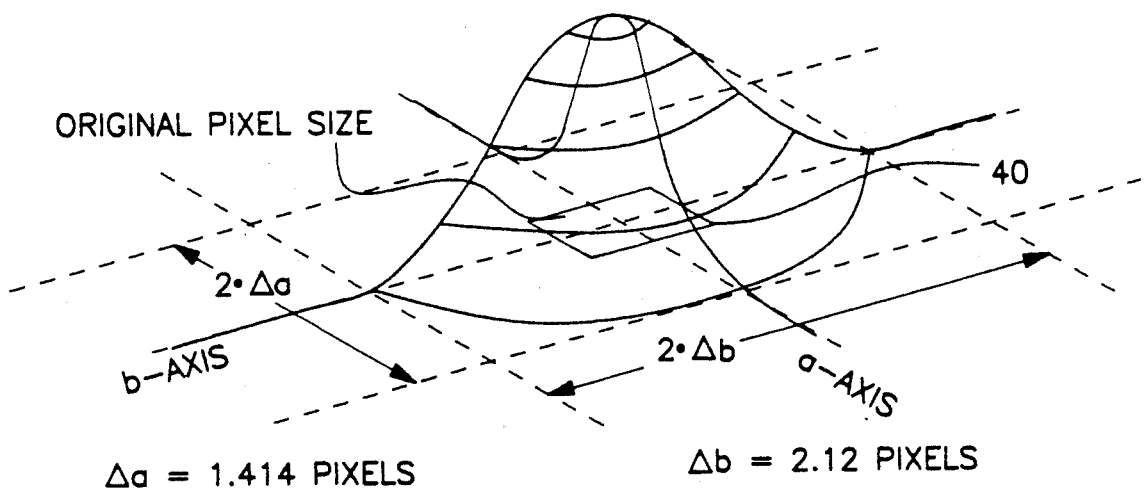
FIG. 15 illustrates the resultant pixel luminance profile when a cubic B-spline interpolation function is applied to a diagonal color mosaic pixel, showing the relative length to width ratio.

FIG. 15 shows the intensity profile of a pixel from a diagonal color mosaic display after it has undergone a cubic B-spline interpolation. This may also be described as the resultant pixel luminance profile when cubic B-spline interpolation is applied to diagonal color mosaic pattern. Thus in FIG. 15 there is shown the original pixel size 40, the size of $\Delta a = 1.414$ pixels and of $\Delta b = 2.12$ pixels. The figure also shows the ratio of diagonal color mosaic $$= \frac{\Delta a}{\Delta b} = 1.414/2.12.$$

Figure 16:
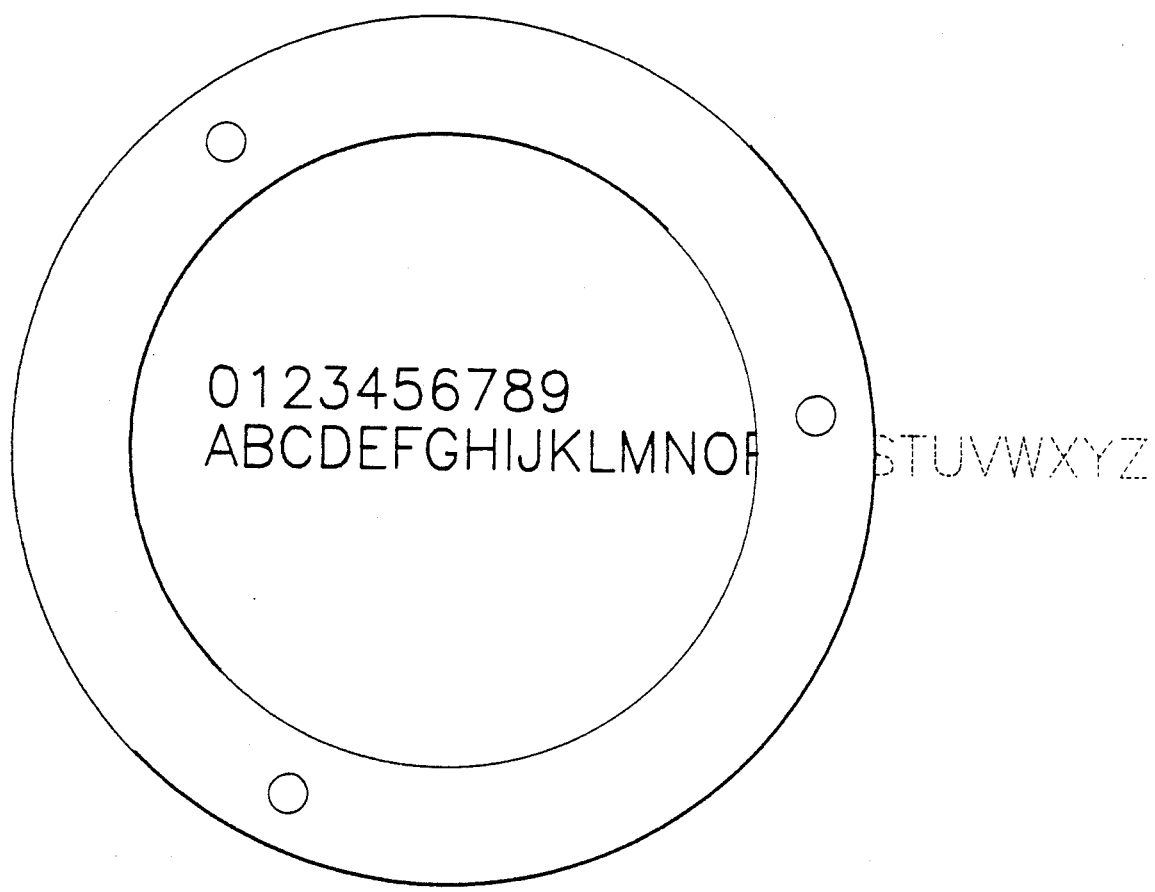
FIG. 16 is a picture of a diffraction grating reconstruction filter used over a color matrix display. This illustrates how the filter causes the individual pixel luminances to spread and smooth together, interpolating the image.

The orientation of the interpolation function can also be changed if desired. FIG. 16 shows this grating over a panel and illustrates the interpolation and resulting smoothing of the sampled image.

The diffraction grating reconstruction filter can be used for any of the pixel patterns used with color matrix displays. In each case, by tailoring the filter to the lattice structure as explained above, the full frequency capability of each particular pattern is used. Frequencies beyond this capability are eliminated. The result is enhanced image quality on color matrix displays.

In FIG. 8 there is shown the major axes a and b and the separation between same color pixels R, G, and B of diagonal color mosaic pattern. In this figure the interpolation function is oriented along the plus and minus 45 degree axes of the diagonal mosaic pattern. The separation between adjacent R pixels is shown to be $$d_{a\text{-}axis} = \sqrt{(1\text{ pixel})^2 + (1\text{ pixel})^2} = 1.414 \text{ pixels}.$$

On the other axis the separation between R pixels the separation is shown to be $$d_{b\text{-}axis} = \sqrt{(1.5\text{ pixels})^2 + (1.5\text{ pixels})^2} = 2.12 \text{ pixels}.$$

The orientation of the interpolation function can also be changed to test questions about preferred axes of orientation of the target image. In the case of static characters, for example, which are predominantely rendered with vertical and horizontal strokes, it may be desirable to orient the interpolation function vertically and horizontally rather than along the plus and minus 45 degree axes of the diagonal mosaic pattern (FIG. 8). Though this extreme is not preferred, this and intermediate orientations can be evaluated by rotating the diffraction grating about an axis normal to the display surface.

In order to determine the surface profile of the diffraction grating, it is necessary to know exactly how this profile controls the diffraction pattern. In determining the diffraction pattern of a particular grating, two factors need to be determined: 1) the lateral spacing of the orders, and 2) the light intensity (or relative efficiency) of the orders.

The lateral spacing of the orders is quite easy to determine. According to diffraction theory, the diffraction angle (the angle a diffracted order makes with respect to normal), $\alpha_p$, is given by the following equation:

$$\sin \alpha_p = \frac{p\lambda}{x} \quad (1)$$

where p is the order number, $\lambda$ is the wavelength, and X is the grating period in the x direction (see FIG. 6a). The case of a viewer looking at a diffracted image is shown in FIG. 4. Using Equation 1, the distance of an order from normal is determined to be $$x = \frac{p\lambda t}{X} \quad (2)$$

where t is the distance between the flat panel and the diffraction grating. This is easily extended to the two dimensional case, where the location of the orders is given by $$x = \frac{p\lambda t}{X}, \text{ and } y = \frac{q\lambda t}{Y}, \quad (3)$$

where q is the order number, and Y is the grating period in the y direction. The distance between any two adjacent orders is therefore given by $$\text{order spacing} = \frac{\lambda t}{X}, \text{ or } \frac{\lambda t}{Y}. \quad (4)$$

These equations can be used to estimate the range of grating frequencies necessary for flat panel applications. Assume a wavelength of 550 mm, and a 1 mm space between panel and grating. For a panel with a 6 mil pixel size, we can assume an approximate order spacing of 1-6 mils (we will want to move the 1st order image 1-6 mils away from the zero order image). Inserting these numbers into Equation 4, the grating period will need to range from 3.6 to $22 \times 10^{-3}$ mm, giving a frequency range of 45-275 cycles/mm. The exact frequency is determined by the design of precisely how far the orders are to be moved.

In order to find the intensity of each of the orders a mathematical derivation of the Fraunhofer (far field) diffraction order efficiency for a two-dimensional grating has been derived. The efficiency, $n_{p,q}$, or relative intensity of each order is approximately:

$$n_{p,q} = \left| \frac{1}{XY} \int_X \int_Y e^{[2\pi i(\frac{px}{X} + \frac{qy}{Y}) - iw(x,y)]} dx dy \right|^2 \quad (5)$$

where w(x,y) is the phase shift introduced by passage through the grating, and is given by $$w(x,y) = \frac{2\pi(n_o - n_1)s(x,y)}{\lambda} \quad (6)$$

where $n_o$ is the refractive index of the surrounding medium (usually air, $n_o=1$), and $n_1$ is the refractive index of the grating material, and s(x,y) is the function which describes the surface profile of the diffraction grating.

Figure 17A:
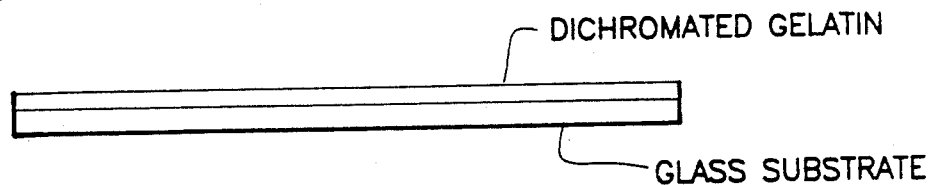
Figure 17C:
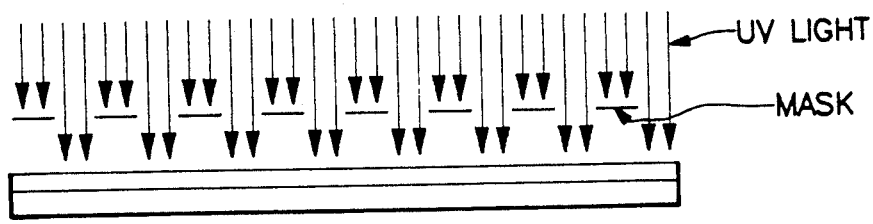
Figure 17C:
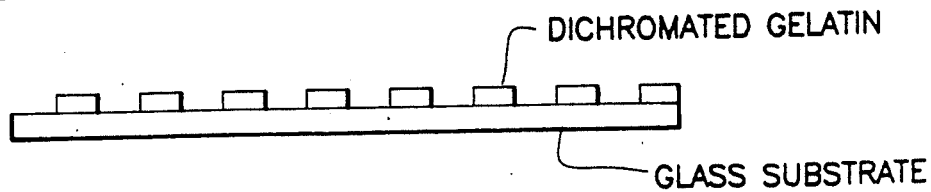
Figure 18B:
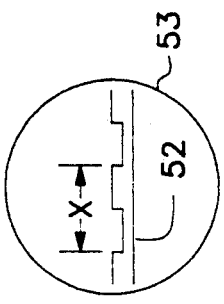
FIGS. 18a and 18b show an example of flat panel color matrix display together with a diffraction grating reconstruction filter in front of it.
Figure 18A:
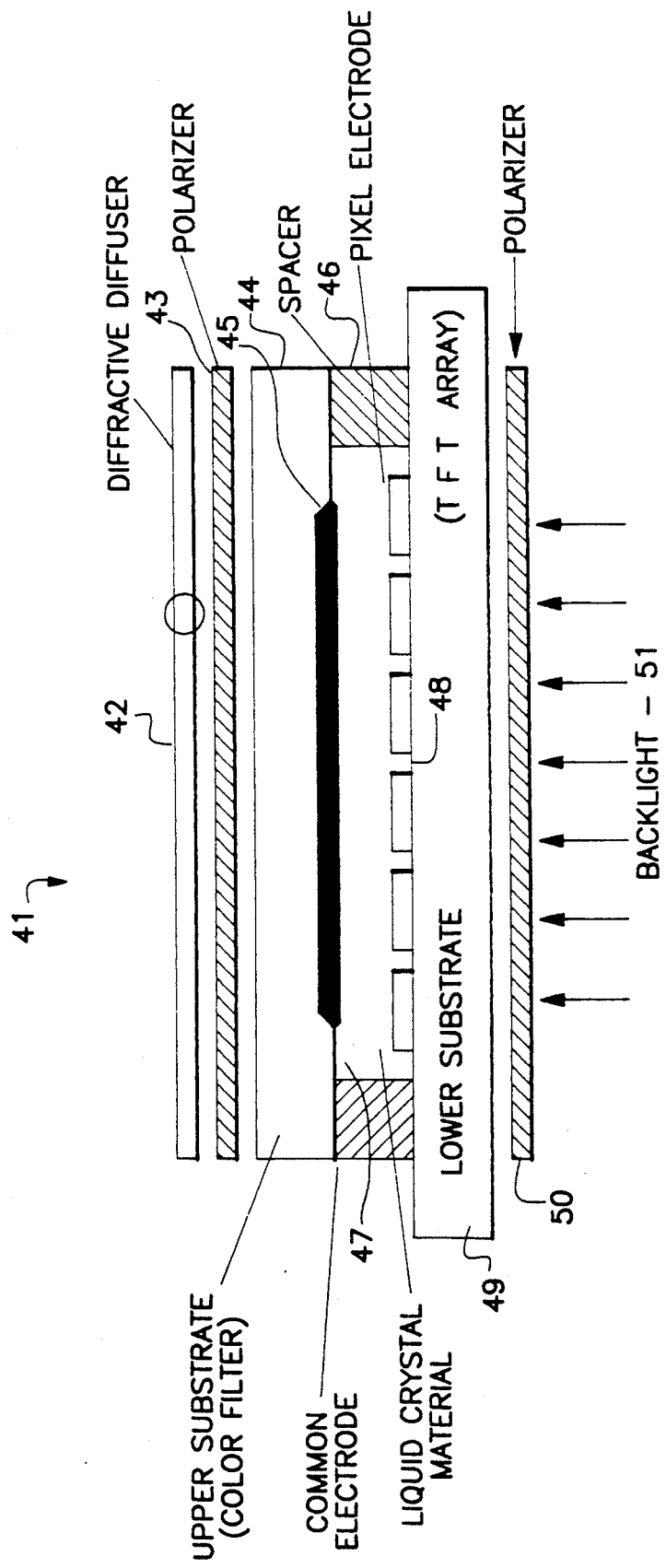

One process for fabricating a diffraction grating with dichromated gelatin using photolithographic techniques is illustrated in FIGS. 17a-17c. A layer of photoresist material, such as dichromated gelatin, is spun or otherwise deposited onto a glass substrate. Then through a mask the photoresist material is exposed with uv light. The areas which have been exposed are washed away with water, leaving a surface profile of dichromated gelatin. In one example the mask used to prepare gratings has 100 lines/mm in both the x and y directions. FIGS. 18a and 18b show the flat panel structure 41 and how the diffraction grating reconstruction filter (diffuser) 42 can be placed. The diffraction diffuser 42 here takes the form of a thin glass substrate, with a phase relief structure deposited upon it, placed over the last polarizer 43 in the flat panel stack. Beneath polarizer 43 is an upper substrate color filter 44, a common electrode 45, a spacer 46, the liquid crystal material 47 and the flat panel display 48 on the lower substrate 49. Polarizer 50 may be positioned beneath the lower substrate 49. Backlighting 51 is provided. A magnified section 52 of the diffuser 42 is shown in the balloon 53.

Figure 19:
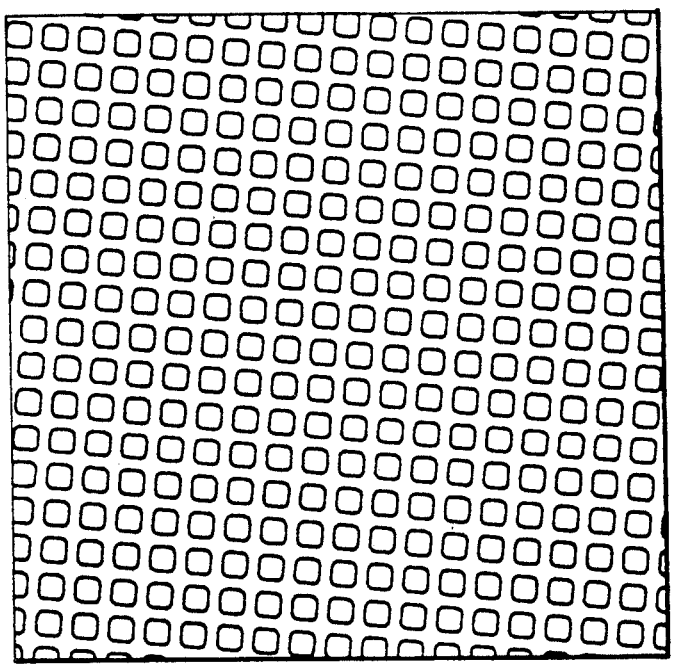
FIG. 19 is a representation of a grating fabricated with the 100 line/mm mask.
Figure 20:
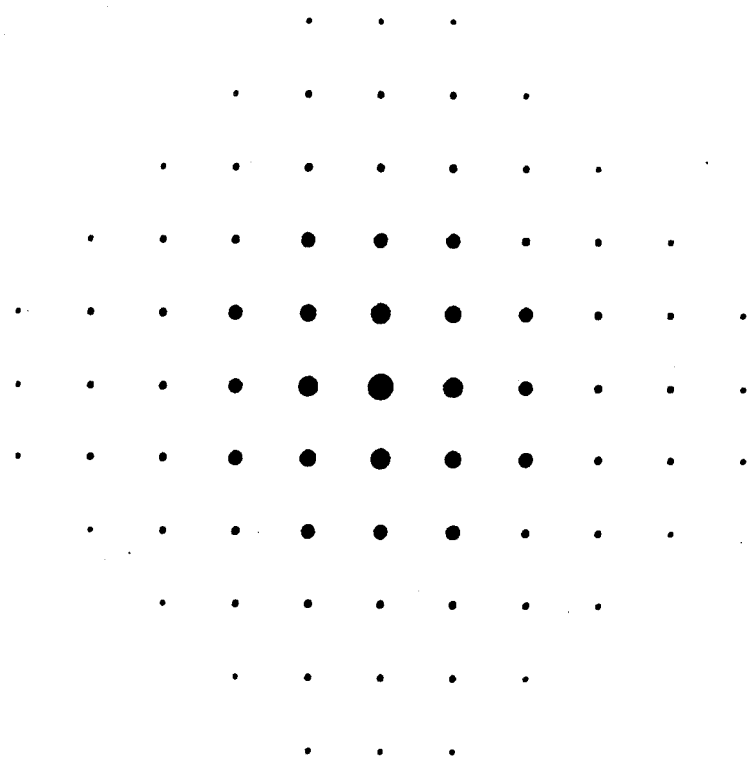
FIG. 20 shows the pattern created when a laser beam is passed through the grating.

A drawing of a photograph of a grating fabricated with the 100 line/mm mask is shown in FIG. 19. The circles are "wells" where the dichromated gelatin has been removed. FIG. 20 shows the pattern created when a laser beam is passed through the grating. A large throw distance was used to spread out the orders and illustrate their relative efficiencies. For flat panel use the diffraction grating is closely spaced to the panel so that the orders are all overlapping.

Those skilled in the art will appreciate that as well as using a liquid crystal display other types of displays can be utilized, including a plasma panel display, an electroluminescent display and vacuum fluorescent displays. The above mentioned displays exhibit display characteristics substantially similar to liquid crystal in that they are flat and individual pixels can be addressed and positioned in a similar manner. The method of the invention can be utilized to improve the display characteristics of all of the above display types.

Thus, the present invention has entailed how one goes about specifying the filter requirements for a diffraction grating to operate as an optical reconstruction filter, when a particular flat panel liquid crystal color mosaic pattern is given. There is specified a method of determining filter cutoff requirements given any pixel pattern on the color matrix display; and there is specified the filter cutoff requirements in terms of each primary color lattice in the mosaic. The present invention is of a design to permit maximum use of available color mosaic spatial frequency capacity.

The embodiments of an invention in which an exclusive property or right is claimed are defined as follows:

1. An improved flat panel color mosaic (or matrix) display apparatus which uses a diffraction grating reconstruction filter to reduce image artifacts, the apparatus comprising:
   a flat panel color matrix display, the flat panel color matrix display having a viewing face and comprising a regular structure of pixels which are selectively energized to create an image having high frequency energy, the color matrix display being subject to an inherent underlying grid structure which results in objectionable visual artifacts called sampling noise which lowers image quality; and
   a two-dimensional diffraction grating reconstruction filter positioned proximate and in front of said matrix display viewing face which diffracts the image to substantially filter the image, the diffraction grating breaking each pixel image up into various diffraction orders in two-dimensions as it passes through the grating, whereby the diffracted pixels overlap and cause interpolation among the pixels thereby minimizing the high frequency energy and detection of the underlying grid structure and improving the image.

2. The apparatus according to claim 1 in which the color mosaic display is of a type selected from the group consisting of liquid crystal, plasma panels, electroluminescent, and vacuum fluorescent displays.

3. The apparatus according to claim 1 in which the color mosaic display is a flat panel liquid crystal color matrix display.

4. The apparatus according to claim 3 in which the color matrix display is an active matrix liquid crystal display.

5. The apparatus according to claim 3 in which there are major axes (in x and y) of pixel pattern for same color pixels.

6. The apparatus according to claim 3 in which said liquid crystal display comprises a glass substrate and in which said two-dimensional diffraction grating is embedded as an integral component of said liquid crystal color mosaic display glass substrate.

7. The apparatus according to claim 3 in which said grating is juxtaposed the surface of said liquid crystal color mosaic display.

8. The apparatus according to claim 5 in which said major axes for same color pixels is a diagonal matrix pattern.

9. The apparatus according to claim 5 in which the axes of said two-dimensional diffraction grating is oriented to the major axes of the flat panel pixel pattern.

10. The apparatus according to claim 8 in which the axes of said two-dimensional diffraction grating is oriented to the diagonal major axes of the flat panel pixel pattern.

11. The apparatus according to claim 1 in which the diffraction grating is a phase transmission grating.

12. The apparatus according to claim 11 in which the phase transmission grating is a binary step type.

13. The apparatus according to claim 1 in which the diffraction grating has a point spread function defined by the primary color's lattice structure of the color mosaic display.

14. The apparatus according to claim 1 in which said two-dimensional diffraction grating reconstruction filter positioned proximate and in front of said matrix display viewing face has a spacing "t" therebetween, the controlling of the spacing allowing the extent of interpolation desired to be obtained.

15. An improved flat panel color mosaic (or matrix) display apparatus which is used with a diffraction grating reconstruction filter to reduce flat panel image artifacts, the apparatus comprising:
   a flat panel color matrix display, the matrix display having a viewing face and comprising a regular structure of color pixels which are selectively energized to create an image, the matrix display unfortunately being subject to an inherent underlying grid structure which results in objectionable visual artifacts called image sampling noise which lowers image quality; and
   a two-dimensional diffraction grating reconstruction filter positioned proximate and in front of said color matrix display viewing face which diffracts the image to substantially filter the image, the diffraction grating breaking each pixel image up into various diffraction orders in two-dimensions as it passes through the grating, whereby the diffracted pixels overlap and cause interpolation among the pixels thereby minimizing the image sampling noise and improving the image.

16. The apparatus according to claim 15 in which the matrix display is a liquid crystal display.

17. The apparatus according to claim 15 in which said two-dimensional diffraction grating reconstruction filter positioned proximate and in front of said matrix display viewing face has a spacing "t" therebetween, the controlling of the spacing allowing the extent of interpolation desired to be obtained.

18. The apparatus according to claim 15 in which there are major axes (in x and y) of pixel pattern for same color pixels.

19. The apparatus according to claim 18 in which said major axes for same color pixels is a diagonal matrix pattern.

20. The apparatus according to claim 19 in which the axes of said two-dimensional diffraction grating are oriented to the diagonal major axes of the flat panel pixel pattern.

21. The apparatus according to claim 18 in which the axes of said two-dimensional diffraction grating are oriented to the major axes of the flat panel pixel pattern.

22. A flat panel liquid crystal color matrix display stack assembly including an optical reconstruction filter in the form of a diffraction grating, the flat panel stack assembly comprising in combination:
   backlight means;
   first polarizer means;
   a two-dimensional liquid crystal display means;
   second polarizer means; and
   a two-dimensional diffractive diffuser spaced from said liquid crystal display by a spacing distance t so that an image of a point on said liquid crystal display is thereby diffractively diffused.

23. The apparatus according to claim 22 in which said diffractive diffuser is a two-dimensional diffraction grating reconstruction filter positioned proximate and in front of said display means with a spacing "t" therebetween, the controlling of the spacing allowing the extent of interpolation desired to be obtained.

24. The assembly according to claim 22 in which the diffractive diffuser is a diffraction grating reconstruction filter, the diffraction grating breaking each liquid crystal pixel image up into various diffraction orders as it passes through the grating whereby the diffracted pixels overlap and cause interpolation among the pixels.

25. A method for designing a diffraction grating optical reconstruction filter for a color mosaid (or matrix) display comprising the steps:
   providing a flat panel two-dimensional color matrix display having regular structures of color pixels of a plurality of primary colors, said flat panel display having an inherent underlying grid structure which results in objectionable visual artifacts in the display commonly referred to as sampling noise; specifying each primary color lattice in the display;
   determining Nyquist boundaries in two-dimensions;
   applying the Nyquist boundaries to define the extent of traditional interpolation functions and therefore the filter cutoff requirements; embodying these interpolation functions in the form of a phase diffraction grating; and applying the phase diffraction grating over the surface of the color matrix display to alter the point spread function of each pixel.

26. A method for designing a diffraction grating optical reconstruction filter for a color mosaic (or matrix) display comprising the steps:
   providing a flat panel two-dimensional color matrix display having regular structures of color pixels of a plurality of primary colors, said flat panel display having an inherent underlying grid structure which results in objectionable visual artifacts in the display commonly referred to as sampling noise;
   specifying each primary color lattice in the display;
   determining lattice as defined by each primary color alone;
   determining spatial frequency pattern of lattice by taking Fourier Transform;
   determining Nyquist boundaries by,
      circumscribing a region having a region shape by drawing a ray from a reference point to each nearest neighbor point,
      at midpoint of each ray drawing a perpendicular bisector line, said rays together forming a collection of perpendicular bisectors,
      the region circumscribed is maximum frequency capability of the color mosaic display,
      the collection of perpendicular bisectors comprise the Nyquist boundaries themselves; select interpolation waveform, one dimensional; making one dimensional waveform into two dimensional waveform by rotating it through two dimensions and by adjusting its relative extent in accordance with the shape of the region circumscribed by the Nyquist boundaries thereby defining the desired point spread function of the grating in combination with the eye; making the grating have point spread function minus the impact of the eye; and, placing the grating over the panel at a distance t.

* * * * *

UNITED STATES PATENT AND TRADEMARK OFFICE
CERTIFICATE OF CORRECTION

PATENT NO. : 5,046,827
DATED : September 10, 1991
INVENTOR(S) : Keith L. Frost It is certified that error appears in the above-identified patent and that said Letters Patent is hereby corrected as shown below:

Column 5, line 16; "Fig." should read:

"Figs."

Column 8, line 1; "shows" should read:

"show"

Column 8, line 9; Equation should read:

Sin ((x)/x)

Column 10, line 25; Equation 5 should read:

$$n_{p,q} = \left| \frac{1}{XY} \int_X \int_Y e^{\left[ 2\pi i \left( \frac{px}{X} + \frac{qy}{Y} \right) - i\, w(x,y) \right]} dx\, dy \right|^2 \quad (5)$$

Column 13, line 26; "mosaid" should read:

"mosaic"

Signed and Sealed this

Twenty-third Day of March, 1993

*Attest:*

STEPHEN G. KUNIN

*Attesting Officer*      *Acting Commissioner of Patents and Trademarks*

REEXAMINATION CERTIFICATE (4406th)

United States Patent
Frost et al.

(10) Number: US 5,046,827 C1
(45) Certificate Issued: Aug. 7, 2001

(54) OPTICAL RECONSTRUCTION FILTER FOR COLOR MOSAIC DISPLAYS

(75) Inventors: Keith L. Frost, Scottsdale; Karen E. Jachimowicz, Goodyear; Michael J. Johnson, Phoenix, all of AZ (US)

(73) Assignee: Honeywell Inc., Minneapolis, MN (US)

Reexamination Request:
No. 90/005,507, Sep. 27, 1999

Reexamination Certificate for:
Patent No.: 5,046,827
Issued: Sep. 10, 1991
Appl. No.: 07/382,514
Filed: Jul. 20, 1989

Certificate of Correction issued Mar. 23, 1993.

(51) Int. Cl.⁷ .................................... G02F 1/1335
(52) U.S. Cl. ............................ 349/112; 349/109
(58) Field of Search .............. 349/63, 96, 104, 349/106, 109, 112; 359/559, 563, 569, 571, 599; 345/32, 88

(56) References Cited

U.S. PATENT DOCUMENTS

| | | | |
|---|---|---|---|
| 3,840,695 | * 10/1974 | Fischer | 349/112 |
| 3,914,761 | * 10/1975 | Murase et al. | |
| 3,957,354 | * 5/1976 | Knop | 350/162.19 |
| 4,251,137 | * 2/1981 | Knop et al. | 350/347 V |
| 4,255,019 | * 3/1981 | Knop | 350/167 |
| 4,800,375 | * 1/1989 | Silverstein et al. | 350/339 F |
| 4,871,232 | * 10/1989 | Grinberg et al. | 350/162.11 |

FOREIGN PATENT DOCUMENTS

| | | | |
|---|---|---|---|
| 0182645 | * 5/1986 | (EP) | 350/334 |
| 61-74247 | 9/1984 | (JP) . | |
| 63-114475 | 10/1986 | (JP) . | |
| 0055624 | * 3/1987 | (JP) | 350/339 D |

OTHER PUBLICATIONS

Handbook for Electronics, Information and Communication Engineers, 1988, pp. 295–296; translation thereof.
New Edition Electrical Enginnering Handbook, Feb. 28, 1988, pp. 390–395; translation thereof.
M. Gale et al "Diffractive Diffusers for Display Applications" pp. 165–168—SPIE—vol. 679—Current Developments in Optical Engineering—Aug. 1986.*
Patent Abstract of Japan—vol. 9, No. 86 (p. 349) Apr. 16, 1985 JP–A–59 214 825—Abstract Dec. 1984.*

* cited by examiner

Primary Examiner—Kenneth Parker

(57) ABSTRACT

An optical reconstruction filter in the form of a phase diffraction grating (that is, a diffractive diffuser) placed between a flat panel liquid crystal color matrix display and a viewer to optically filter flat panel images and present a higher quality image to the viewer.

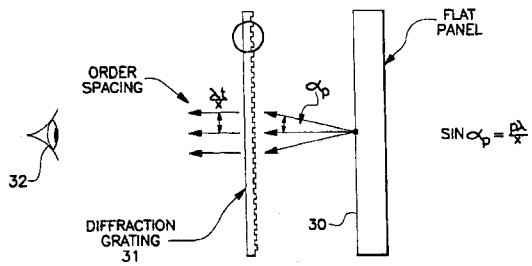

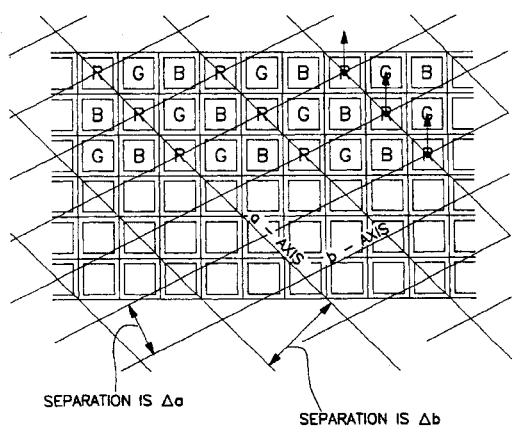

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25 and 26 is confirmed.

Claims 1–4, 6–9, 13, 15, 19, 22 and 24 are determined to be patentable as amended.

Claims 5, 10–12, 14, 16–18, 20, 21 and 23, dependent on an amended claim, are determined to be patentable.

1. An improved flat panel color [mosaic (or] matrix[)] display apparatus which uses a diffraction grating reconstruction filter to reduce image artifacts, the apparatus comprising:
   a flat panel color matrix display, the flat panel color matrix display having a viewing face and comprising a regular structure of pixels *of a plurality of primary colors* which are selectively energized to create an image having high frequency energy, the color matrix display being subject to an inherent underlying grid structure which results in objectionable visual artifacts called sampling noise which lowers image quality; and
   a two-dimensional diffraction grating reconstruction filter positioned proximate and in front of said matrix display viewing face which diffracts the image to substantially filter the image, the diffraction grating breaking each pixel image up into various diffraction orders in two-dimensions as it passes through the grating, whereby the diffracted [pixels] *pixel images* overlap and cause interpolation among the [pixels] *diffracted pixel images* thereby minimizing the high frequency energy and detection of the underlying grid structure and improving the image, *wherein the diffraction grating has spatial frequency passband characteristics determined by an underlying lattice structure of the color matrix display, further wherein the underlying lattice structure determines a spatial sampling array for each of the plurality of primary colors.*

2. The apparatus according to claim 1 in which the *flat panel* color [mosaic] *matrix* display is of a type selected from the group consisting of liquid crystal, plasma panels, electroluminescent, and vacuum fluorescent displays.

3. The apparatus according to claim 1 in which the *flat panel* color [mosaic] *matrix* display is a flat panel liquid crystal color matrix display.

4. The apparatus according to claim 3 in which the *flat panel liquid crystal* color matrix display is an active matrix liquid crystal display.

6. The apparatus according to claim 3 in which said *flat panel* liquid crystal *color matrix* display comprises a glass substrate and in which said two-dimensional diffraction grating is embedded as an integral component of said *flat panel* liquid crystal color [mosaic] *matrix* display glass substrate.

7. The apparatus according to claim 3 in which said grating is juxtaposed the surface of said liquid crystal color [mosaic] *matrix* display.

8. The apparatus according to claim 5 in which said major axes for same color pixels [is] *are oriented to* a diagonal matrix pattern.

9. The apparatus according to claim 5 in which the axes of said two-dimensional diffraction grating [is] *are* oriented to the major axes of the flat panel pixel pattern.

13. The apparatus according to claim 1 in which the diffraction grating has a point spread function defined by the primary [color's] *colors'* lattice structure of the color [mosaic] *matrix* display.

15. An improved flat panel color [mosaic (or] matrix[)] display apparatus which is used with a diffraction grating reconstruction filter to reduce flat panel image artifacts, the apparatus comprising:
   a flat panel color matrix display, the matrix display having a viewing face and comprising a regular structure of color pixels *of a plurality of primary colors* which are selectively energized to create an image, the matrix display unfortunately being subject to an inherent underlying grid structure which results in objectionable visual artifacts called image sampling noise which lowers image quality; and
   a two-dimensional diffraction grating reconstruction filter positioned proximate and in front of said color matrix display viewing face which diffracts the image to substantially filter the image, the diffraction grating breaking each pixel image up into various diffraction orders in two-dimensions as it passes through the grating, whereby the diffracted [pixels] *pixel images* overlap and cause interpolation among the [pixels] *diffracted pixel images* thereby minimizing the image sampling noise and improving the image, *wherein the diffraction grating has spatial frequency passband characteristics determined by an underlying lattice structure of the color matrix display, where the underlying lattice structure determines a spatial sampling array for each of the plurality of primary colors.*

19. The apparatus according to claim 18 in which said major axes for same color pixels [is] *are oriented to* a diagonal matrix pattern.

22. A flat panel liquid crystal color matrix display stack assembly including an optical reconstruction filter in the form of a diffraction grating, the flat panel stack assembly comprising in combination:
   backlight means;
   first polarizer means;
   a two-dimensional liquid crystal display means *including color pixels having a plurality of primary colors*;
   second polarizer means; and
   a two-dimensional diffractive diffuser spaced from said liquid crystal display by a spacing distance t so that an image of a point on said liquid crystal display is thereby diffractively diffused, *wherein the two-dimensional diffractive diffuser has spatial frequency passband characteristics determined by an underlying lattice structure of the two-dimensional liquid crystal display means, where the underlying lattice structure determines a spatial sampling array of each primary color.*

24. The assembly according to claim 22 in which the diffractive diffuser is a diffraction grating reconstruction filter, the diffraction grating breaking each liquid crystal pixel image up into various diffraction orders as it passes through the grating whereby the diffracted [pixels] *pixel images* overlap and cause interpolation among the [pixels] *diffracted pixel images*.

* * * * *